US006986063B2

(12) United States Patent
Colvin

(10) Patent No.: US 6,986,063 B2
(45) **Date of Patent: *Jan. 10, 2006**

(54) METHOD FOR MONITORING SOFTWARE USING ENCRYPTION INCLUDING DIGITAL SIGNATURES/CERTIFICATES

(75) Inventor: David S. Colvin, Commerce Township, MI (US)

(73) Assignee: Z4 Technologies, Inc., Commerce Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/357,588

(22) Filed: Feb. 4, 2003

(65) Prior Publication Data

US 2003/0110375 A1 Jun. 12, 2003

Related U.S. Application Data

(63) Continuation-in-part of application No. 09/818,819, filed on Mar. 27, 2001, now Pat. No. 6,799,277, which is a continuation-in-part of application No. 09/535,321, filed on Mar. 27, 2000, now Pat. No. 6,460,142, which is a continuation of application No. 09/090,620, filed on Jun. 4, 1998, now Pat. No. 6,044,471.

(60) Provisional application No. 60/192,284, filed on Mar. 27, 2000.

(51) Int. Cl.
*H04L 9/32* (2006.01)
*G06F 17/60* (2006.01)

(52) U.S. Cl. ....................... 713/202; 713/158; 713/175; 713/176; 705/51; 705/58

(58) Field of Classification Search ................. 713/150, 713/155–158, 168, 170, 175, 176, 193, 194, 713/200–202; 705/14, 50–59; 709/229; 717/168, 717/174, 171–173, 176–178

See application file for complete search history.

(56) References Cited

U.S. PATENT DOCUMENTS 4,658,093 A 4/1987 Hellman
4,796,220 A 1/1989 Wolfe (Continued)

OTHER PUBLICATIONS

Magid, "Software Rentals Revisited—The Growth of the Internet, Intranets, and extranets has revived the concept of renting software and added a twist" Aug. 18, 1997, Informationweek, n. 644, p. 132.

Li et al., "Matlab Tutorial" Jan. 3, 1999, http://www-.me.umn.edu/courses.me4232/tutorial.html.

Duncan, "What's New in Netware 3.2", Feb. 1998, Novell Research, p. 1–12.

Gomes, "Rumor About Windows 95 snooping program refuses to die" Aug. 17, 1995, The Gazette.

*Primary Examiner*—Christopher Revak
(74) *Attorney, Agent, or Firm*—Brooks Kushman P.C

(57) ABSTRACT

A method and system for reducing unauthorized software use include generating a key based on computer-specific information of a computer on which the software is installed and using the key to encrypt an authorization code which enables use of the software on the computer. A representative maintains contact with the software user as a new authorization code from the representative is required after some period of use of the software. The representative encrypts the new password using the key and transfers the encrypted key to authorize use of the software for a next period of use. The encrypted password is a form of digital signature or certificate which is unique to a particular computer and limits use of the software to the particular computer. The key may be generated using various computer-specific information such as the motherboard/processor identification, the number of bad sectors or hard disk identification, and/or the amount of installed memory.

40 Claims, 6 Drawing Sheets

U.S. PATENT DOCUMENTS

| | | | | | |
|---|---|---|---|---|---|
| 4,827,508 | A | | 5/1989 | Shear | |
| 5,014,234 | A | | 5/1991 | Edwards, Jr. | |
| 5,182,770 | A | | 1/1993 | Medveczky et al. | |
| 5,199,066 | A | | 3/1993 | Logan | |
| 5,287,408 | A | | 2/1994 | Samson | |
| 5,337,357 | A | | 8/1994 | Chou et al. | |
| 5,341,429 | A | | 8/1994 | Stringer et al. | |
| 5,457,746 | A | | 10/1995 | Dolphin | |
| 5,495,411 | A | | 2/1996 | Ananda | |
| 5,509,070 | A | | 4/1996 | Schull | |
| 5,541,991 | A | | 7/1996 | Benson | |
| 5,548,645 | A | | 8/1996 | Ananda | |
| 5,553,139 | A | | 9/1996 | Ross et al. | |
| 5,564,038 | A | | 10/1996 | Grantz et al. | |
| 5,579,479 | A | | 11/1996 | Plum | |
| 5,606,614 | A | | 2/1997 | Brady et al. | |
| 5,638,513 | A | | 6/1997 | Ananda | |
| 5,652,793 | A | | 7/1997 | Priem et al. | |
| 5,717,756 | A | | 2/1998 | Coleman | |
| 5,757,925 | A | | 5/1998 | Faybishenko | |
| 5,765,152 | A | * | 6/1998 | Erickson | 707/9 |
| 5,771,347 | A | | 6/1998 | Grantz et al. | |
| 5,790,664 | A | | 8/1998 | Coley et al. | |
| 5,812,764 | A | | 9/1998 | Heinz, Sr. | |
| 5,815,484 | A | | 9/1998 | Smith et al. | |
| 5,842,124 | A | | 11/1998 | Kenagy et al. | |
| 5,845,065 | A | | 12/1998 | Conte et al. | |
| 5,845,077 | A | | 12/1998 | Fawcett | |
| 5,848,397 | A | | 12/1998 | Marsh et al. | |
| 5,862,299 | A | * | 1/1999 | Lee et al. | 386/94 |
| 5,870,543 | A | | 2/1999 | Ronning | |
| 5,870,610 | A | | 2/1999 | Beyda | |
| 5,883,954 | A | | 3/1999 | Ronning | |
| 5,883,955 | A | | 3/1999 | Ronning | |
| 5,907,617 | A | | 5/1999 | Ronning | |
| 5,920,861 | A | | 7/1999 | Hall et al. | |
| 5,931,901 | A | | 8/1999 | Wolfe et al. | |
| 5,935,246 | A | | 8/1999 | Benson | |
| 5,940,074 | A | | 8/1999 | Britt, Jr. et al. | |
| 5,943,422 | A | | 8/1999 | Van Wie et al. | |
| 5,974,454 | A | | 10/1999 | Apfel et al. | |
| 5,974,461 | A | | 10/1999 | Goldman et al. | |
| 5,978,476 | A | | 11/1999 | Redman et al. | |
| 5,991,402 | A | | 11/1999 | Jia et al. | |
| 5,999,622 | A | | 12/1999 | Yasukawa et al. | |
| 6,000,033 | A | | 12/1999 | Kelley et al. | |
| 6,006,328 | A | | 12/1999 | Drake | |
| 6,009,401 | A | | 12/1999 | Horstmann | |
| 6,009,525 | A | | 12/1999 | Horstmann | |
| 6,023,268 | A | | 2/2000 | Britt, Jr. et al. | |
| 6,023,766 | A | | 2/2000 | Yamamura | |
| 6,029,145 | A | | 2/2000 | Barritz et al. | |
| 6,044,469 | A | | 3/2000 | Horstmann | |
| 6,044,471 | A | * | 3/2000 | Colvin | 713/202 |
| 6,049,671 | A | | 4/2000 | Slivka et al. | |
| 6,067,621 | A | | 5/2000 | Yu et al. | |
| 6,068,156 | A | | 5/2000 | Liff et al. | |
| 6,073,214 | A | | 6/2000 | Fawcett | |
| 6,073,256 | A | | 6/2000 | Sesma | |
| 6,134,659 | A | * | 10/2000 | Sprong et al. | 713/190 |
| 6,141,754 | A | | 10/2000 | Choy | |
| 6,157,721 | A | | 12/2000 | Shear et al. | |
| 6,182,144 | B1 | | 1/2001 | England | |
| 6,185,682 | B1 | | 2/2001 | Tang | |
| 6,189,097 | B1 | | 2/2001 | Tycksen, Jr. | |
| 6,243,692 | B1 | | 6/2001 | Floyd et al. | |
| 6,272,636 | B1 | | 8/2001 | Neville et al. | |
| 6,275,934 | B1 | | 8/2001 | Novicov et al. | |
| 6,334,214 | B1 | | 12/2001 | Horstmann | |
| 6,338,112 | B1 | | 1/2002 | Wipfel et al. | |
| 6,349,335 | B1 | | 2/2002 | Jenney | |
| 6,363,356 | B1 | | 3/2002 | Horstmann | |
| 6,363,486 | B1 | | 3/2002 | Knapton, III | |
| 6,446,211 | B1 | * | 9/2002 | Colvin | 713/202 |
| 6,453,334 | B1 | | 9/2002 | Vinson et al. | |
| 6,460,142 | B1 | * | 10/2002 | Colvin | 713/202 |
| 6,484,264 | B1 | * | 11/2002 | Colvin | 713/202 |
| 6,502,195 | B1 | * | 12/2002 | Colvin | 713/202 |
| 6,785,825 | B2 | * | 8/2004 | Colvin | 713/202 |
| 6,792,548 | B2 | * | 9/2004 | Colvin | 713/202 |
| 6,792,549 | B2 | * | 9/2004 | Colvin | 713/202 |
| 6,795,925 | B2 | * | 9/2004 | Colvin | 713/202 |
| 6,799,277 | B2 | * | 9/2004 | Colvin | 713/202 |
| 6,813,717 | B2 | * | 11/2004 | Colvin | 713/202 |
| 6,813,718 | B2 | * | 11/2004 | Colvin | 713/202 |
| 6,857,078 | B2 | * | 2/2005 | Colvin | 713/202 |
| 2001/0044782 | A1 | | 11/2001 | Hughes et al. | |
| 2004/0059938 | A1 | | 3/2004 | Hughes et al. | |

* cited by examiner

METHOD FOR MONITORING SOFTWARE USING ENCRYPTION INCLUDING DIGITAL SIGNATURES/CERTIFICATES

CROSS-REFERENCE TO RELATED APPLICATIONS

This application is a continuation-in-part of U.S. application Ser. No. 09/818,819, filed on Mar. 27, 2001 now U.S. Pat. No. 6,799,277; which is a continuation-in-part of U.S. application Ser. No. 09/535,321, filed on Mar. 27, 2000, now U.S. Pat. No. 6,460,142; which is a continuation of U.S. application Ser. No. 09/090,620, filed on Jun. 4, 1998, now U.S. Pat. No. 6,044,471; the disclosures of which are hereby incorporated in their entirety. U.S. application Ser. No. 09/818,819 claims the benefit of U.S. provisional application Serial No. 60/192,284, filed on Mar. 27, 2000.

BACKGROUND OF THE INVENTION

1. Field of the Invention

The present invention relates to methods and systems for monitoring compliance with software licensing terms and information transfer using digital signatures, digital wrappers, digital certificates, and the like.

2. Background Art

Illegal use of computer software results in significant revenue loss for the industry. Software use in violation of licensing agreements ranges from installing a purchased copy of software on more computers than licensed, using software beyond its licensed period, sharing software with a friend or coworker, and illegally copying or pirating software over the Internet. As software distribution and application service providers (ASPs) expand the use of the Internet to download application software directly to users' computers, the occurrence of all forms of software piracy is likely to increase.

A number of strategies have been employed to reduce or make more difficult the unauthorized use and/or duplication of software. Unfortunately, many of these attempts to secure the software result in more difficulty for both licensed users and pirates alike leading to user dissatisfaction and complaints. One such approach provides a hardware device or "key" which may be installed on an I/O port of the computer to provide a software interlock. If the key is not in place, the software will not execute. This method is relatively expensive for the developer and cumbersome for the authorized user while remaining vulnerable to theft by duplication of the hardware key.

Another approach to reduce unauthorized use of software requires the user to enter a serial number or customer identification number during installation of the software. Missing or invalid registration information prevents installation of the software. This approach is easily defeated by transferring the serial number or customer identification number to one or more unauthorized users. Furthermore, once the user or pirate obtains the appropriate serial number, the software can be used indefinitely.

Yet another approach requires registering the software with the manufacturer or distributor to obtain an operational code or password necessary for installation of the software. Again, once the operational code or password is obtained, it may be perpetually transferred along with pirated copies to numerous unauthorized users.

Various copy protection strategies have been developed to prevent unauthorized copies or limit the number of copies made for a particular user in an effort to reduce the number of unauthorized copies available. This approach is generally disfavored, particularly by corporate users who may have a legitimate need to make backup or archival copies or transfer a copy to a new computer or hard drive.

Prior art strategies have enjoyed various levels of success in reducing unauthorized use of software. However, the more sophisticated strategies which are difficult to defeat also pose problems for legitimate users. Furthermore, many conventional software copy protection strategies are not directly applicable to electronic software distribution (ESD) or software supplied by ASPs. As such, software developers need a method and system for reducing unauthorized use of software which does not burden the authorized users to dissuade them from purchasing and using the protected software.

SUMMARY OF THE INVENTION

Thus, an object of the present invention is to provide a method and system for reducing unauthorized use of software using digital signatures, digital wrappers, digital certificates, and the like.

Another object of the present invention is to provide a method and system for limiting use of the software to a particular computer based on computer-specific information.

Yet another object of the present invention is to provide a method and system for providing an authorization code, password, or activation code based on computer-specific information and being encrypted to resist tampering by potential hackers or pirates.

A further object of the present invention is to provide a method and system for a software manufacturer to require users to repeatedly contact an authorized representative to obtain authorization/activation codes to continue using the software.

A further object of the present invention is to provide a method and system for reducing unauthorized use of software which facilitates periodic software updates and forwarding of information, when and if desired.

Yet another object of the present invention is to provide a secure method and system for the repeated exchange of information utilizing digital signatures, digital certificates, digital wrappers, digital envelopes, and the like.

In carrying out the above objects and other objects, the present invention provides a method for reducing unauthorized use of computer software. The method includes contacting a computer software representative to obtain an activation code (i.e., password or authorization code) to authorize continued operation of the software on a computer such that the software is useable without requiring continuous contact with the representative. Registration information from the software user or the computer is collected upon contact with the representative. An activation code is transferred from the representative to at least one of the software, the software user, and the computer using a digital signature or digital certificate (or digital wrapper or digital envelope, etc.) to resist modification of the activation code. The authenticity of the digital signature or certificate is then authenticated before allowing the software to operate on the computer. The steps of contacting, collecting, transferring, and verifying are repeated at predetermined periods.

The digital signature or certificate may incorporate various computer-specific information which identifies the particular user or computer, such as a component serial number, disk drive statistics, network card MAC address, for example. Encryption may also be used alone or in combination with the digital certificates and/or signatures to increase the security and reduce the likelihood of successful tampering with the use monitoring features where desired.

A number of advantages are associated with various implementations of the present invention. For example, the present invention reduces unauthorized use of software without imposing a significant burden on authorized users and provides security utilizing digital signatures, digital certificates, digital wrappers, digital envelopes, and the like. Computer-specific information may be used to limit use of the software to a particular computer/user. Digital signatures and the like used alone and/or in combination with encryption make the authorization information and expiration date virtually immune from alteration by hackers and software pirates.

The present invention controls the number of copies of authorized software by monitoring registration information and deactivation of suspected pirate copies. Requiring authorized users to periodically update a password or authorization/activation code provided by a password administrator (i.e., representative) improves accuracy of contact information for marketing related products and distribution of product updates. The present invention also provides a variable level of software security which can be tailored to the particular application depending upon the value of the application to potential software pirates. Security may be modified by using more sophisticated encryption keys and/or algorithms in conjunction with digital signatures/certificates/wrappers/envelopes, for example.

The present invention is adaptable to all computer systems, including stand alone computers, LAN computers and workstations, and WAN computer and work stations, servers, PDAs, and the like. The present invention is also adaptable to all forms of computer readable storage mediums and software distribution including floppy disks, CD ROMs, DVDs, floptical disks, magnetic tape, hard drives, electronic transfer, electronic software distribution (ESD), and the like.

In sum, the present invention provides a method and system for reducing unauthorized use of software by generating a unique key based on computer-specific information of the computer on which the software is installed. The key is used to encrypt an authorization code (i.e., activation code or password) which enables continued use of the software. In one embodiment, a new authorization code is required after some period of use of the software. This allows the representative to maintain contact with the user and transfer information to the user in addition to the authorization code. Such information may include advertising, promotional, or marketing information, for example.

The encrypted authorization code is a form of digital signature or certificate which is unique to a particular computer and limits use of the software to the particular computer. Installation of the software on other computers may be authorized by the representative depending upon the particular licensing terms, or to monitor/track unauthorized use of the software. The unique key used to encrypt the authorization code may be generated using various computer-specific information alone or in combination, such as the motherboard/processor identification, the number of bad sectors or hard disk identification, and/or the amount of installed memory, for example. Repeated contact with the representative to obtain subsequent authorization codes may accommodate changes made to the computer which affect the encryption key (rather than indicating a different computer) so that operation of the software is not disabled for authorized users.

BRIEF DESCRIPTION OF THE DRAWINGS

FIGS. 3*a*–3*d* provide a more detailed flow diagram illustrating representative embodiments of a method and system for securing software according to the present invention.

DETAILED DESCRIPTION OF THE PREFERRED EMBODIMENT(S)

Figure 1:
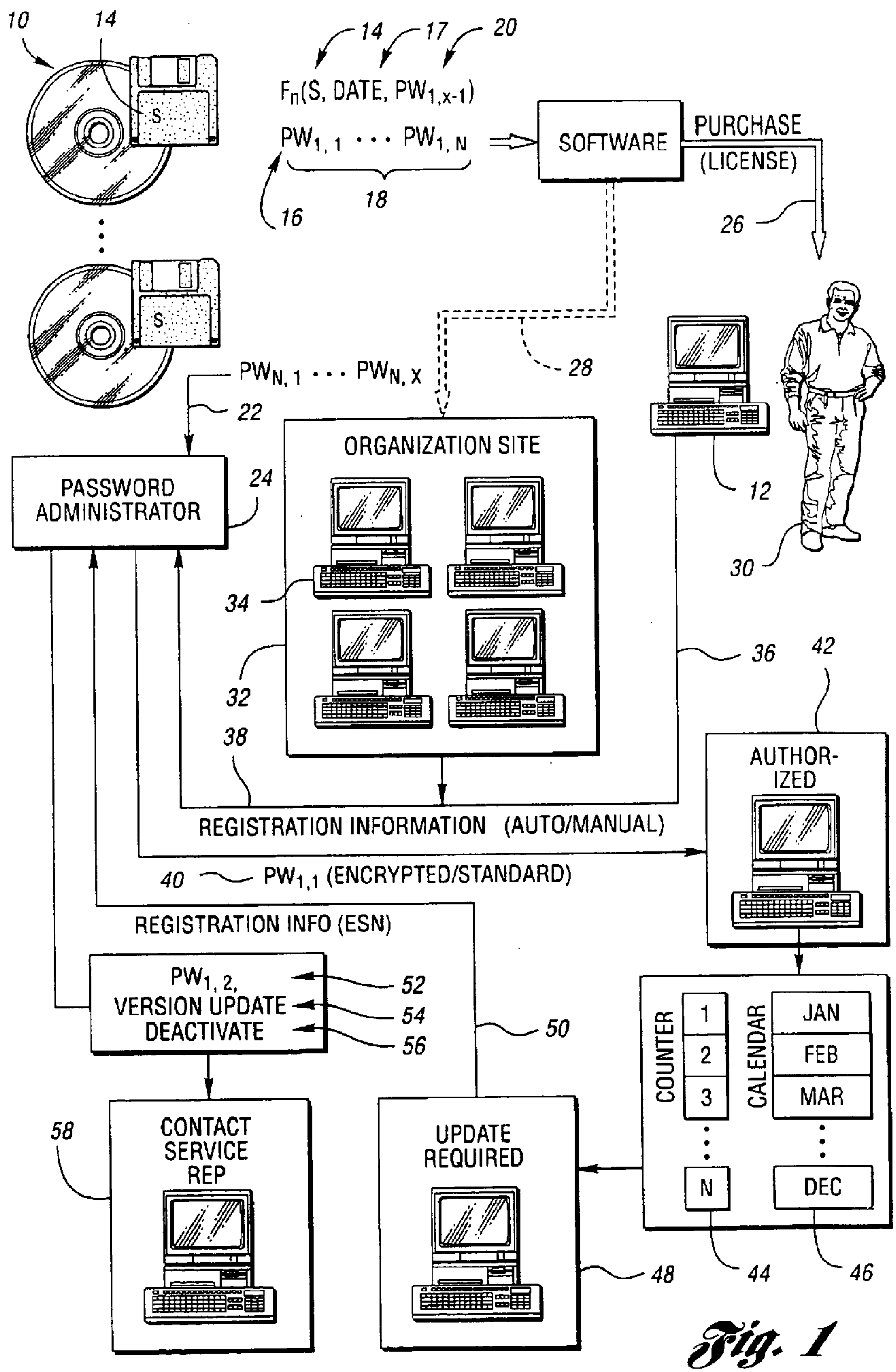
FIG. 1 is a block diagram illustrating various features of a method and apparatus for securing software according to the present invention.

Referring now to FIG. 1, a block diagram illustrating various features of a method and system for securing software according to the present invention is shown. Manufacturers or developers create application programs or software which is stored in the form of data representing program instructions executable by a computer on computer readable media 10. Computer readable media 10 may include any medium capable of storing such instructions which is directly or indirectly readable by a computer, such as computer 12. Computer readable media 10 may include floppy disks, hard drives, CD-ROMs, floptical disks, magnetic tape, ESD, and the like.

Each copy or group of copies of the software may have an associated serial number, indicated generally by reference numeral 14, and an associated password 16 which may be one of a series of associated passwords 18 as explained in greater detail below. Each password 16 may be an alphanumeric character string which may be encoded or encrypted or a binary or hexadecimal machine readable string to resist tampering by unauthorized users. Passwords 16 within series 18 may be randomly assigned or may be generated using a suitable algorithm, many of which are known in the art. Likewise, passwords 16 may be based on serial number 14, a current date or version date 17, and/or a previous password 20 from the series of passwords.

After the password or passwords are created and associated with one or more serial numbers or copies of the software, they may be transferred to an authorized representative of the software, as represented by arrow 22, such as a password administrator 24. Of course, the original manufacturer or developer of the software may also function as password administrator 24. The software may be distributed by purchase or more commonly it is licensed as represented by arrows 26 and 28 to individuals 30 and groups 32, respectively. Preferably, the software is distributed to the end users without its associated password 16 which must be obtained from password administrator 24.

Alternatively, computer readable media 10 may be distributed with a first password 16 of a series of passwords 18. Each authorized user preferably has software with a unique identifier, such as a serial number, whether the authorized user is an individual, such as user 30, or a group or region, indicated generally by reference numeral 32. However, the same password or series of passwords may be associated with a number of serial numbers to reduce the administrative burden for password administrator 24. For example, each end user 34 associated with organization or site 32 may have the same password or series of passwords. Preferably, not more than one password is distributed with each authorized copy so that the end users will need to contact password administrator 24 to obtain additional passwords for continued use of the software as explained in greater detail below.

During the initial use or installation of the software on computers 12,34, a password or authorization code will be required by the software to function properly. The end user must contact the authorized representative for the software, such as password administrator 24, to obtain the appropriate authorization code or password as indicated generally by arrows 36. Password administrator 24 obtains registration information 38 from the end user and provides an appropriate password or authorization code to the software as indicated by reference numeral 40.

Communication of registration information and the authorization code may be accomplished either manually or automatically depending upon the particular application and configuration of the software. Manual communication may be by email, regular mail, telephone, automated voice response system, web browser, direct modem transfer, or the like but requires a varying level of intervention by the end user depending upon the particular type of communication. Automatic communication may use similar methods or means to communicate the information but is performed without user intervention, although the user may be advised or notified that the process is occurring or has occurred.

Registration information 38 may include traditional contact information, such as name, address, email, phone, etc., but preferably includes information which can be obtained without intervention by the end user to improve its veracity. Such information may include identification of a TCP/IP address, originating telephone number, or computer-specific information associated with the computer or the end user. Computer-specific information may include an electronic serial number (ESN) which uniquely characterizes the hardware configuration of the computer based on information stored in the computer's non-volatile CMOS, registry, motherboard serial number, or the like.

Password administrator 24 preferably stores the registration information to be used for various purposes according to the present invention to reduce unauthorized use of software. For example, password administrator 24 may use the registration information to monitor compliance with licensing terms by determining whether a particular serial number has been installed on more than one computer or by more than one end user. Administrator 24 may compare the registration information with previously received registration information to determine whether to issue an authorization code or password, or to provide a code which disables further operation of the software. The registration information may also be used to contact the end users for marketing new products or versions, or providing software updates.

The password or authorization code is communicated to the software as represented by reference numeral 40. Depending upon the particular implementation, the password may be provided to the end user who manually enters the information into computer 42 to begin or continue using the software. The password or authorization code may be encoded as an alphanumeric string using various numbers and letters which represent meaningful information to the administrator but appear to be randomly generated to the end user. Alternatively, an encryption algorithm may be used to transmit the information.

Preferably, the password authorizes the software to execute on computer 42 for a first predetermined period as represented by counter 44 or calendar 46. The predetermined period may vary based on the particular authorized user, the cost of the software, the number of estimated unauthorized copies, etc. For example, it is anticipated that more expensive software would provide a shorter period of authorization to provide a higher level of security. The higher revenue generated by the software offsets any increased administrative expense of password administrator 24 due to the increased frequency of updates required.

As indicated by counter 44 and calendar 46, the authorized period of use may be measured either in calendar days (months, years, etc.) or in execution hours, number of accesses, or the like. Once the authorized period expires, the software requires a new password or authorization code as indicated by reference numeral 48. This may be accomplished automatically and transparently to the end user by electronically contacting password administrator 24 and exchanging current registration information 50. Administrator 24 may compare the current registration information 50 with previously received registration information to determine if at least a portion of the information matches for that particular serial number or group of serial numbers. This comparison may be used to determine whether the end user is an authorized user or an unauthorized user.

The information provided to the software by administrator 24 may depend upon whether the user is determined to be authorized or unauthorized. For example, if the user is determined to be an authorized user, a subsequent password 52 from the series of passwords associated with the software serial number or group may be communicated which authorizes the software for an additional operation period. As the software becomes less valuable, such as when new versions are released, the authorization period may increase and preferably eventually allows indefinite use of the software. Of course, an exceedingly long period (10 years for example) may be essentially equivalent to an indefinite period of operation. In addition to a subsequent password, an updated version 54 of the software may be transferred or offered to the end user.

If the user is determined to be an unauthorized user, an appropriate message may be transmitted to alert the user to a discrepancy in the registration information, and the operational password may be withheld. Alternatively or in addition, a code 56 which deactivates the software may be communicated. As another alternative, a shortened authorization period may be provided along with a password and a message which indicates the end user must contact administrator 24 or another customer service representative to verify the user's status as represented by reference numeral 58. In the event the user is determined to be unauthorized, password administrator 24 may decline to download a password at which time the software may automatically become inoperative after the current operational period has lapsed.

Figure 2:
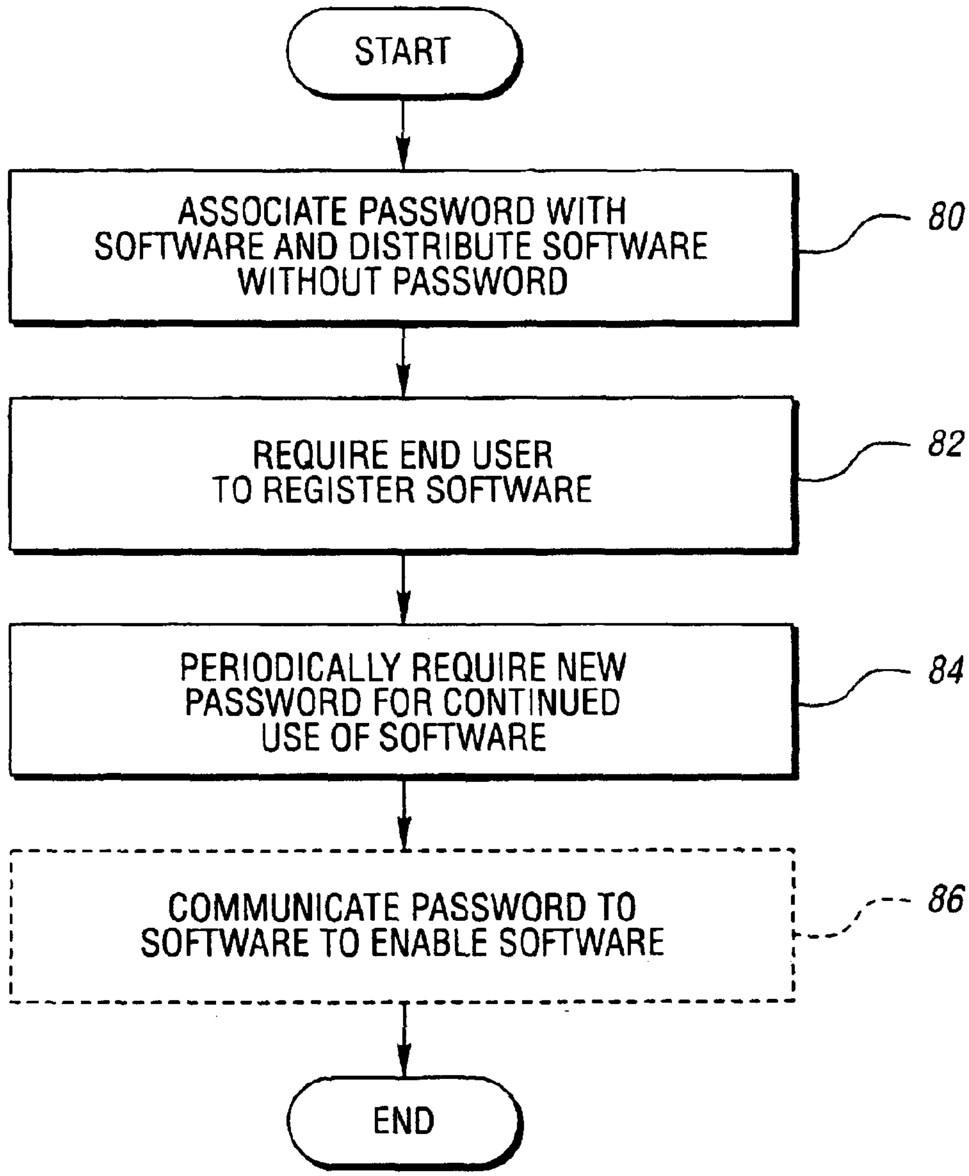
FIG. 2 is a flow diagram illustrating generally the operation of a method and system for securing software according to the present invention.

Referring now to FIG. 2, a flow diagram generally illustrating operation of a method and system for securing software according to the present invention is shown. A password or series of passwords is associated with a particular copy or group of copies of software prior to distribution (without the password or with only one of a series of passwords) as represented by block 80. A series of passwords may be associated with the software using an appropriate password generation algorithm with parameters which vary based on the particular copy. For example, an algorithm or mathematical equation or formula may be used to generate passwords with one or more of the parameters of the equation corresponding to letters or characters in the serial number of the software.

For applications which have only a single password for each copy or group of copies, the password may not be distributed with the software so the end user must contact the developer or authorized representative as represented by block 82. For applications with two or more passwords, an initial password may be provided or the software may operate without a password for a first period to provide ample opportunity for the end user to acquire the initial/subsequent password. Registration information may be required as a precondition to providing a valid authorization code or password. This allows the developer or authorized representative to monitor compliance with licensing terms and/or take appropriate action for unauthorized users.

The password or authorization code is communicated to the software as represented by block 84 to make the software operational on the end user's computer. This may be performed automatically, without user intervention, or manually when initiated by the user using various communication channels, such as regular mail, email, web browser, direct modem connection, etc. The method may optionally require periodic updates at regular, irregular, or random intervals based on elapsed running time, calendar time, or the like, as represented by block 86. The software may prompt the user when the end of the authorization period is approaching to provide an opportunity to obtain a subsequent authorization code for continued use of the software.

Figure 3A:
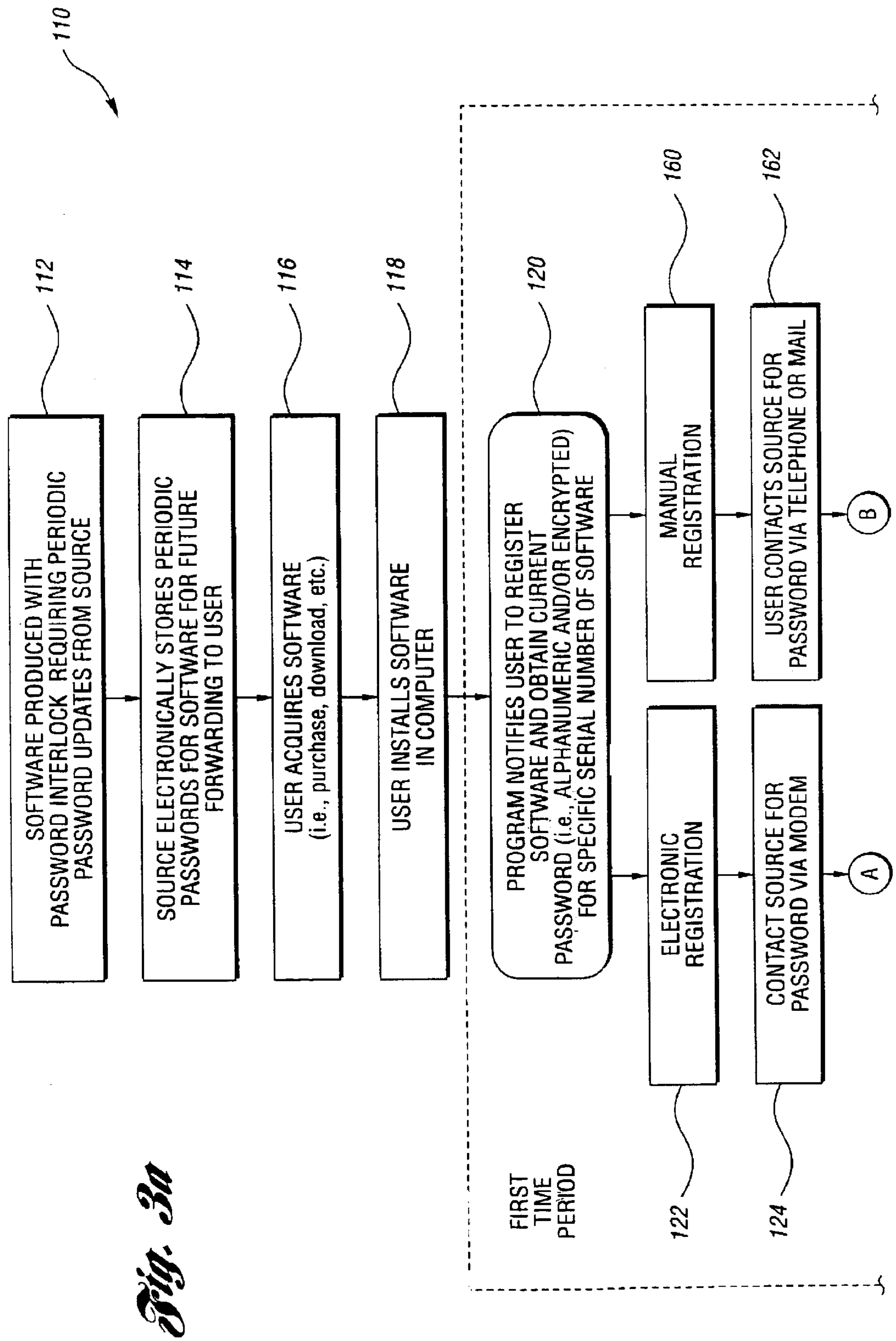

Referring now to FIG. 3*a,* a more detailed flow diagram illustrating a method and/or system for securing software according to the present invention is shown. The software manufacturer or developer (source) produces software which requires initial and/or periodic password updates to become or to remain operational as depicted in box 112. Software may be associated with individual end users, a regional (geographic) or other group of users, or users associated with a particular organization or site. Providing passwords or authorization codes for groups rather than each individual significantly reduces the number of passwords required and the corresponding administrative overhead including electronic storage and transmission requirements.

Following production by the software manufacturer, the source electronically stores the password information for future transmission to the user as shown in box 114. The password information may be the actual passwords or information used to generate subsequent passwords based on the individual copy or group of copies of the software. The embodiment depicted in FIGS. 3*a*–3*d* is intended to interlock specific pieces or groups of software with corresponding passwords or authorization codes.

Once the software is acquired by the user 116, the user installs (partially or fully) the software in his computer or computer network 118. Following installation of the software, the user is prompted to register the software and obtain the necessary operational password which may be an alphanumeric string which is encoded or encrypted, or a binary (machine readable) code. The user is allowed to choose between automatic or manual registration 120. If automatic registration is selected 122, the program automatically contacts the source via a modem or other connection to obtain the operational password following registration 124.

Figure 3B:
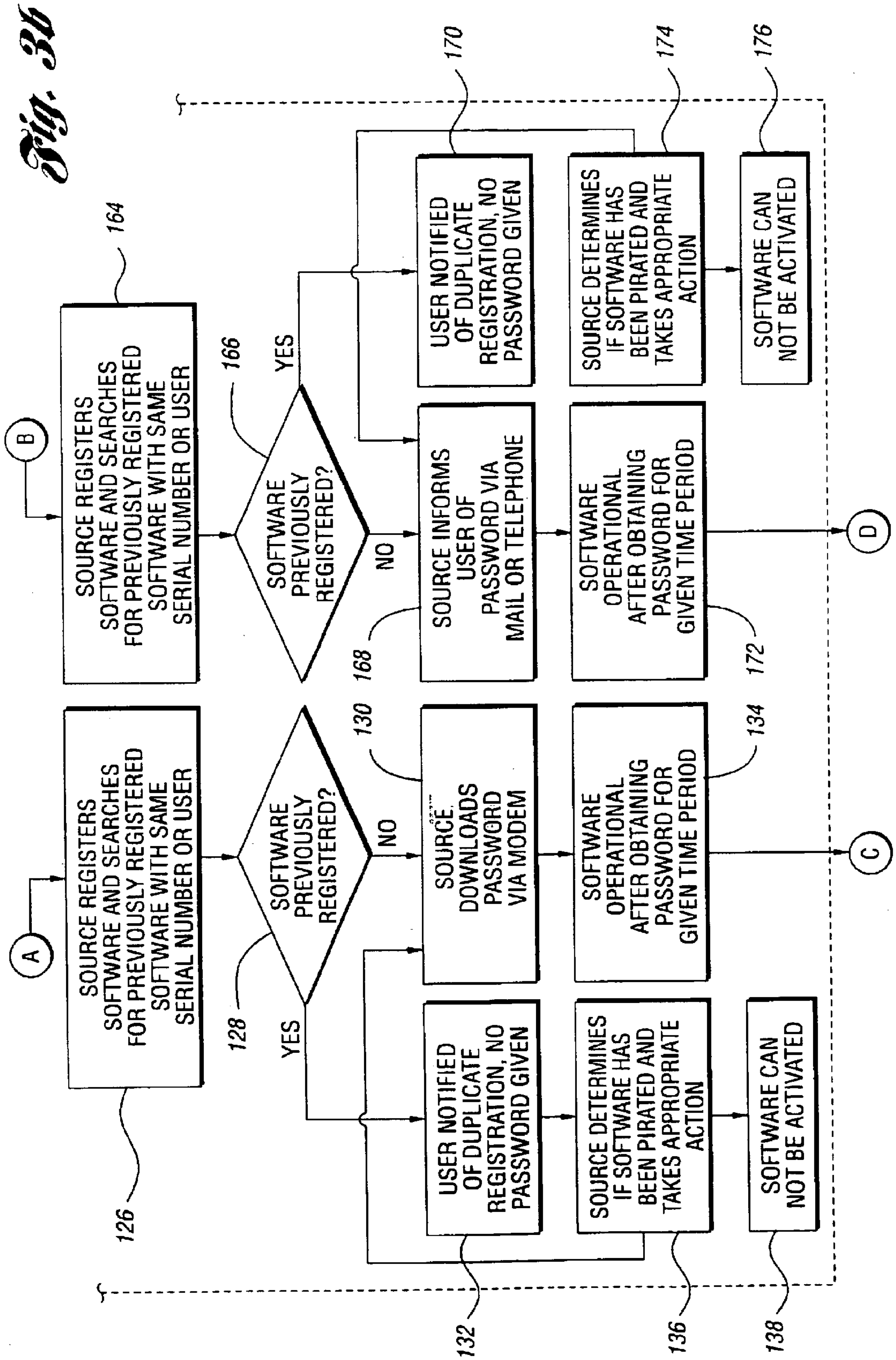

Once contacted, the source searches for previous registration of the software with the registration number or user identification 126 as shown in FIG. 3*b*. If the software has not been previously registered 128, the source transmits the necessary password 130 wherein the software becomes operational 134. If registration information has been previously entered and does not match the current registration information, the source notifies the user of a previous registration of the same software 132 and thereafter takes appropriate action 136. Such action can either include denying the necessary operational password 138, continuing the password download if the source desires 130 or other appropriate action or actions.

Figure 3C:
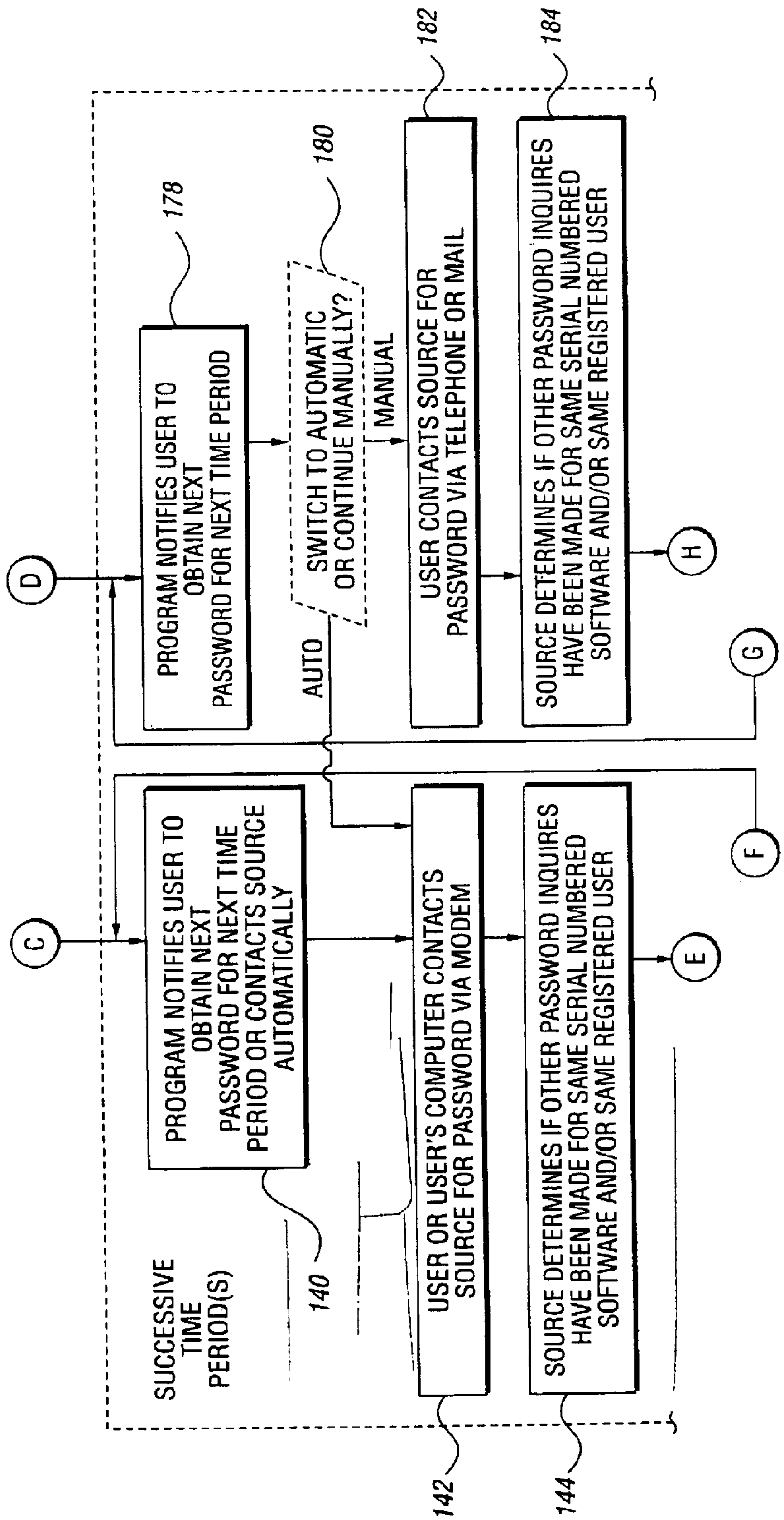
Figure 3B:
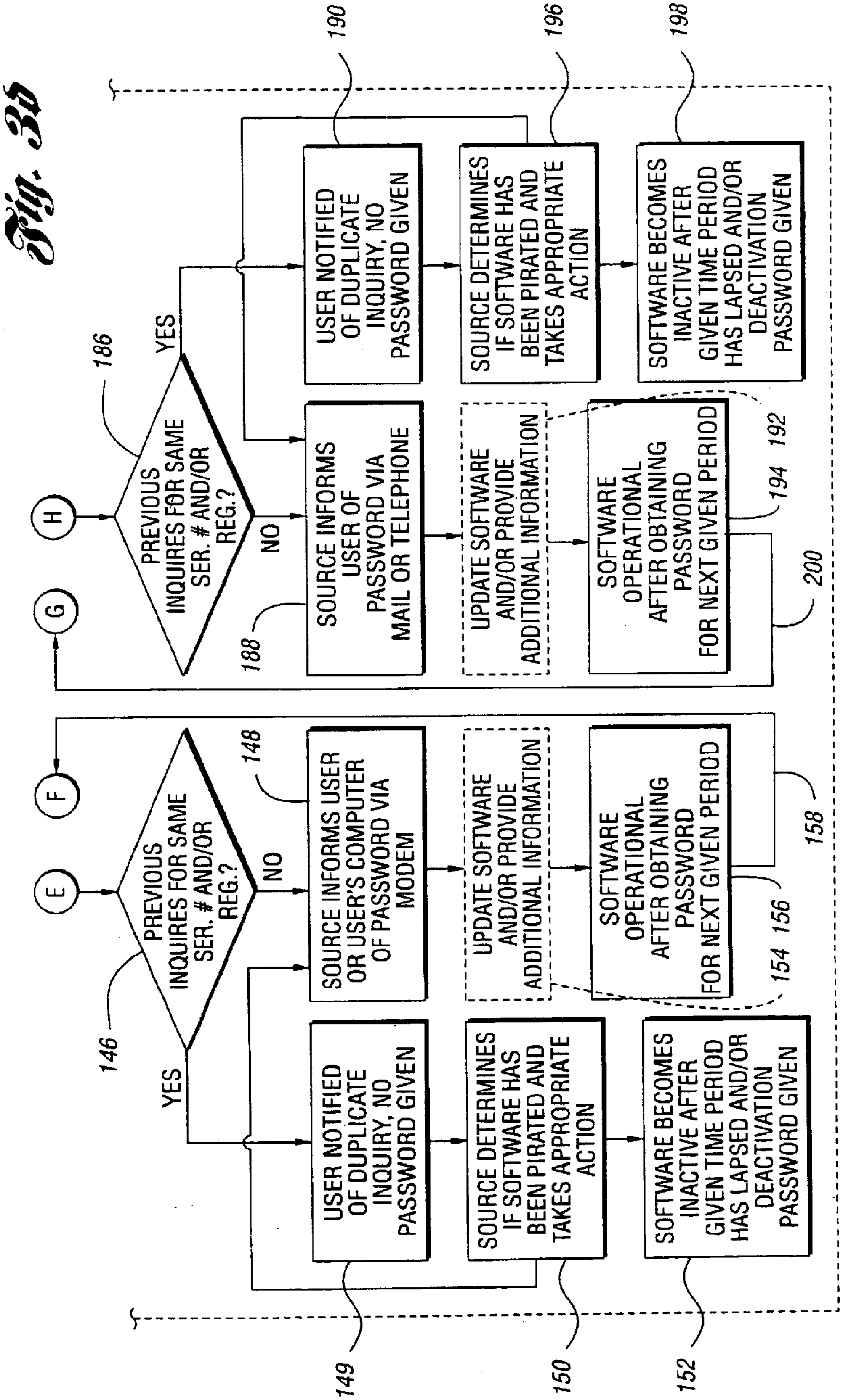

Following the initial registration of the software and downloading of the first operational password, the software remains operational for a given interval which may be an operation period or time period (random, regular, or irregular). Once the first interval expires, the program notifies the user of the necessity to obtain the next operating password 140 as shown in FIG. 3*c*. The user's computer contacts the source via modem 142 and the source determines if previous inquiries have been made for the same user 144 based on the registration information. These step(s) may be fully automated, thereby eliminating the need for user intervention or notifying the user.

The source either transmits the password 148 or notifies the user of a duplicate inquiry 149 as shown in FIG. 3*d*. If a duplicate inquiry has been made, the source either declines to download 150 the password so that the software becomes non-operational 152 after the current operational period elapses or the source transmits the password 148 if desired. During any of the contact periods between the source and the user, the source may elect to download software updates or additional information 154. Following the downloading or the necessary operational password, the software becomes or remains operational 156. This sequence is selectively repeated 158 as determined by the authorization interval selected by the source and communicated to the software.

As shown in FIG. 3*a,* the user may have the option of manual registration 160 and password input as opposed to automatic registration. Alternatively, the source may require manual registration to verify the accuracy of at least some of the registration information since it will be used to send the authorization code or password to the user. If the user provides inaccurate information, the password will not be transmitted and the software will not be operational. After initial registration, optionally the user may elect to convert to automatic electronic contact at any time. Where manual registration is selected 160 (or required), the user contacts the source via telephone, mail, email, internet, or the like to obtain the operational password following registration 162.

Once contacted, the source searches for previous registration of the software with the same serial number, registration number or user identification 164 as shown in FIG. 3*b*. If the software has not been previously registered 166, the source transmits the necessary password 168 wherein the software becomes operational 172. If a duplicate registration occurs, the source notifies the user of a previous registration of the same software 170 and thereafter takes appropriate action 174. Such action can either include not providing the necessary operational password 176 or continuing the password transmission if the source desires 168.

Following the initial registration of the software and transmission of the first operational password, the software remains operational for a given operation interval after which the software notifies the user of the necessity to obtain the next operating password 178 as shown in FIG. 3*c*. The user contacts the source via telephone or by mail 182 and the source determines if previous inquiries have been made for the same user 184. The user may elect to convert to automatic electronic registration during this period 180, however, this step is optional.

The source either transmits the password 188 or notifies the user of a duplicate inquiry 190 as shown in FIG. 3*d*. If a duplicate inquiry has been made, the source either declines to download the password 196 (after which the software becomes non-operational 198) or the source transmits the password 188 if desired. During any of the contact periods between the source and the user, the source may elect to transmit software updates or additional information 192. Following the downloading or the necessary operational password the software becomes or remains operational 194. The sequence for successive operation intervals may then be repeated at the source's discretion 200.

It is understood that the representative methods of the present invention do not need to continue after initial registration and password transmission. Likewise, the process may be discontinued at some point in time by downloading a lifetime password which authorizes the software indefinitely. For example, this may be desirable after the software is deemed obsolete. It is further understood that the specific sequencing of events is not necessary for the proper implementation of the present invention. The invention further allows for compatibility with existing software or other security measures.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for reducing unauthorized use of computer software, the method comprising:

supplying a first activation code with the computer software;

requiring entry of the first activation code to at least partially enable the computer software on a computer for use by a computer software used during an initial authorization period;

contacting a computer software representative to obtain at least one additional activation code to repeat the enablement of the computer software on the computer for use by the computer software user during a subsequent authorization period after the initial authorization period and allowing the repeat of the enablement of the computer software to be performed prior to the expiration of the initial authorization period such that the enablement of the computer software can be continuous from the initial authorization period to the subsequent authorization period, the computer software being enabled during the subsequent authorization period without requiring further contact with the computer software representative following entry of the at least one additional activation code;

collecting registration information from at least one of the computer software user and the computer upon contact with the computer software representative;

transferring the at least one additional activation code from the computer software representative to at least one of the computer software, the computer software user, and the computer using a digital signature or certificate to resist modification of the activation code; and verifying authenticity of the digital signature or certificate before allowing the computer software to operate on the computer.

2. The method of claim 1 wherein:

the registration information is collected automatically.

3. The method of claim 1 wherein:

the digital signature or certificate is at least partially based on the registration information.

4. The method of claim 3 wherein:

the registration information includes computer-specific information, wherein the step of verifying authenticity of the digital signature or certificate includes verifying authenticity of the digital signature or certificate based on the computer-specific information.

5. The method of claim 4 wherein:

the computer-specific information includes disk drive statistics.

6. The method of claim 4 wherein:

the computer-specific information includes a computer component serial number.

7. The method of claim 4 wherein:

the computer-specific information includes a network address.

8. The method of claim 4 wherein:

the computer-specific information includes a network interface card (NIC) address.

9. The method of claim 8 wherein:

the NIC address is a media access control (MAC) address.

10. The method of claim 1 wherein the digital signature or certificate includes an expiration date, the method further comprising:

determining whether the digital signature or certificate has expired; and contacting the computer software representative to obtain a new digital signature or certificate for the at least one additional activation code within a predetermined period of expiration.

11. The method of claim 1 further comprising:

encrypting information transferred to and from the computer software representative using an encryption key based on computer-specific information.

12. The method of claim 1 further comprising:

encrypting the computer software using at least some of the registration information; and downloading the encrypted computer software to the computer.

13. The method of claim 1 wherein:

the step of collecting registration information is performed before the computer software is transferred to the computer software user.

14. The method of claim 1 wherein:

the digital signature or certificate is generated using the registration information, the at least one additional activation code, and the serial number of the computer software.

15. The method of claim 1 wherein:

the authorization periods are based on the value of the computer software.

16. A method for reducing unauthorized use of computer software by limiting use of the computer software to a specific computer, the method comprising:

supplying a first activation code with the computer software;

requiring entry of the first activation code to at least partially enable the computer software on a computer for use by a computer software user during an initial authorization period;

contacting a computer software agent to obtain at least one additional activation code to repeat the enablement of the computer software on the computer for use by the computer software user during a subsequent authorization period after the initial authorization period and allowing the repeat of the enablement of the computer software to be performed prior to the expiration of the initial authorization period such that the enablement of the computer software can be continuous from the initial authorization period to the subsequent authorization period, the computer software being enabled during the subsequent authorization period without requiring further contact with the commuter software agent following entry of the at least one additional activation code;

automatically collecting computer-specific information from the computer and transferring the collected computer-specific information to the computer software agent;

encrypting digital information at least partially using the computer-specific information;

receiving the encrypted digital information from the computer software agent;

allowing the computer software to operate on the computer during an authorization period only if the digital information can be decrypted by the computer using the computer-specific information; and repeating the steps of automatically collecting, encrypting, receiving, and allowing at predetermined periods.

17. The method of claim 16 wherein:

the digital information includes information regarding the computer software.

18. The method of claim 16 further comprising:

verifying authenticity of the digital information using a digital certificate.

19. The method of claim 16 further comprising:

verifying authenticity of the digital information using a digital signature.

20. The method of claim 16 wherein:

the computer-specific information includes a network interface card (NIC) address.

21. The method of claim 20 wherein:

the NIC address is a media access control (MAC) address.

22. The method of claim 16 wherein:

the digital information includes information regarding the subsequent authorization period.

23. The method of 16 wherein:

each authorization period is based on elapsed running time of the computer software.

24. The method of claim 16 wherein:

each authorization period is based on a calendar.

25. The method of claim 24 further comprising:

obtaining the current date from the computer software agent; and determining whether to allow the computer software to operate on the computer based on the current date and the current authorization period.

26. A method for providing periodic contact with a computer software user to repeatedly transfer information to the computer software user, the method comprising:

supplying a first activation code with the computer software;

requiring entry of the first activation code to at least partially enable the computer software on a computer for use by a computer software user during an initial authorization period;

contacting a computer software agent to obtain at least one additional activation code to repeat the enablement of the computer software on the computer for use by the computer software user during a subsequent authorization period after the initial authorization period and allowing the repeat of the enablement of the computer software to be performed prior to the expiration of the initial authorization period such that the enablement of the computer software can be continuous from the initial authorization period to the subsequent authorization period, the computer software being enabled during the subsequent authorization period without requiring further contact with the computer software agent following entry of the at least one additional activation code;

receiving registration material from at least one of the computer software user and the computer upon contact with the computer software agent;

encrypting at least a portion of information to be transferred to the computer software user based on the registration material;

transferring the information to the computer software user using a digital signature, a digital certificate, or a digital wrapper; and repeating the steps of receiving, encrypting, and transferring at predetermined periods.

27. The method of claim 26 wherein:

the registration material is received automatically from the computer.

28. The method of claim 26 wherein:

the information transferred to the computer software user includes the at least one additional activation code.

29. The method of claim 26 wherein the registration material includes computer-specific information, the method further comprising:

verifying authenticity of the digital signature, the digital certificate, or the digital wrapper based on the computer-specific information.

30. The method of claim 29 wherein:

the computer-specific information includes disk drive statistics.

31. The method of claim 29 wherein:

the computer-specific information includes a computer component serial number.

32. The method of claim 29 wherein:

the computer-specific information includes a network address.

33. The method of claim 29 wherein:

the computer-specific information includes a network interface card (NIC) address.

34. The method of claim 33 wherein:

the NIC address is a media access control (MAC) address.

35. The method of claim 26 wherein the digital signature, the digital certificate, or the digital wrapper includes an expiration date, the method further comprising:

determining whether the digital signature, the digital certificate, or the digital wrapper has expired; and contacting the computer software agent to obtain a new digital signature, or a new digital wrapper for the information.

36. The method of claim 26 further comprising:

encrypting the registration material to be received from the computer software user or the computer upon contact with the computer software agent using an encryption key based on computer-specific information.

37. The method of claim 26 further comprising:

encrypting the computer software using at least some of the registration material; and downloading the encrypted computer software to the computer.

38. The method of claim 26 wherein:

the step of receiving registration information is performed before the computer software is transferred to the computer software user.

39. The method of claim 26 wherein:

the digital signature, the digital certificate, or the digital wrapper is generated using the registration material, the at least one additional activation code, and the computer software.

40. The method of claim 26 wherein:

the predetermined periods are based on the value of the computer software.

* * * * *

UNITED STATES PATENT AND TRADEMARK OFFICE

CERTIFICATE OF CORRECTION

PATENT NO. : 6,986,063 B2
DATED : January 10, 2006
INVENTOR(S) : David S. Colvin It is certified that error appears in the above-identified patent and that said Letters Patent is hereby corrected as shown below:

Column 9,
Line 36, delete “used” and insert -- user --.

Column 12,
Line 62, after “digital signature,” insert -- a new digital certificate, --.

Signed and Sealed this

Fourteenth Day of March, 2006

JON W. DUDAS
*Director of the United States Patent and Trademark Office*